(12) United States Patent
Suwa (10) Patent No.: US 7,907,193 B2
(45) Date of Patent: Mar. 15, 2011

(54) IMAGE CAPTURING APPARATUS

(75) Inventor: Takeshi Suwa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/606,433

(22) Filed: Oct. 27, 2009

(65) Prior Publication Data

US 2010/0045829 A1 Feb. 25, 2010

Related U.S. Application Data

(63) Continuation of application No. 11/458,124, filed on Jul. 18, 2006, now Pat. No. 7,633,536.

(30) Foreign Application Priority Data

Jul. 19, 2005 (JP) .................................. 2005-209155

(51) Int. Cl.
*H04N 9/64* (2006.01)
*H04N 3/14* (2006.01)

(52) U.S. Cl. ........ 348/243; 348/245; 348/308; 348/241; 348/294

(58) Field of Classification Search .................. 348/243, 348/207.99, 245, 246, 251, 308, 615, 294, 348/244

See application file for complete search history.

(56) References Cited

U.S. PATENT DOCUMENTS

| 5,909,247 | A | * | 6/1999 | Hosokai et al. | 348/302 |
| 6,304,292 | B1 | * | 10/2001 | Ide et al. | 348/243 |
| 6,323,900 | B1 | * | 11/2001 | Kobayashi | 348/241 |
| 6,900,837 | B2 | * | 5/2005 | Muramatsu et al. | 348/243 |
| 6,970,193 | B1 | * | 11/2005 | Kidono et al. | 348/245 |
| 7,098,950 | B2 | * | 8/2006 | Yamamoto et al. | 348/243 |
| 7,633,536 | B2 | * | 12/2009 | Suwa | 348/245 |
| 7,652,691 | B2 | * | 1/2010 | Suwa | 348/230.1 |
| 7,817,197 | B2 | * | 10/2010 | Noguchi | 348/243 |
| 2007/0181687 | A1 | * | 8/2007 | Fukushima et al. | 235/454 |

FOREIGN PATENT DOCUMENTS

JP 09163236 A * 6/1997
JP 2000-032345 A 1/2000

* cited by examiner

*Primary Examiner* — Lin Ye
*Assistant Examiner* — Marly Camargo
(74) *Attorney, Agent, or Firm* — Canon U.S.A. Inc., IP Division (57) ABSTRACT

According to this invention, even when an image capturing apparatus has a plurality of read modes, the frame rate can be prevented from decreasing in a high-resolution video photographing mode. The image capturing apparatus includes an image sensor and drive unit. The image sensor includes an effective image sensing area having a plurality of pixels at the center portion of the image sensor, and a light-shielded pixel area having a plurality of light-shielded pixels at the peripheral portion of the image sensor. The drive unit can drive the image sensor in a plurality of modes, and drives the image sensor such that the plurality of read modes are almost equal to the light-shielded pixel read time BL-MIN for reading pixel signals in the light-shielded pixel area.

4 Claims, 11 Drawing Sheets

FIG. 1

-Prior Art-

-Prior Art-

| | | | | | | | | | | | |
|---|---|---|---|---|---|---|---|---|---|---|---|
| | | HORIZONTAL SHIFT REGISTER ~210 | | | | | | | | | |
| | 1,1 | 2,1 | 3,1 | 4,1 | 5,1 | 6,1 | 7,1 | 8,1 | 9,1 | 10,1 | 11,1 | 12,1 |
| | 1,2 | 2,2 | 3,2 | 4,2 | 5,2 | 6,2 | 7,2 | 8,2 | 9,2 | 10,2 | 11,2 | 12,2 |
| | 1,3 | 2,3 | 3,3 | 4,3 | 5,3 | 6,3 | 7,3 | 8,3 | 9,3 | 10,3 | 11,3 | 12,3 |
| | 1,4 | 2,4 | 3,4 | 4,4 | 5,4 | 6,4 | 7,4 | 8,4 | 9,4 | 10,4 | 11,4 | 12,4 |
| | 1,5 | 2,5 | 3,5 | 4,5 | 5,5 | 6,5 | 7,5 | 8,5 | 9,5 | 10,5 | 11,5 | 12,5 |
| 205 VERTICAL SHIFT REGISTER | 1,6 | 2,6 | 3,6 | 4,6 | 5,6 | 6,6 | 7,6 | 8,6 | 9,6 | 10,6 | 11,6 | 12,6 |
| | 1,7 | 2,7 | 3,7 | 4,7 | 5,7 | 6,7 | 7,7 | 8,7 | 9,7 | 10,7 | 11,7 | 12,7 |
| | 1,8 | 2,8 | 3,8 | 4,8 | 5,8 | 6,8 | 7,8 | 8,8 | 9,8 | 10,8 | 11,8 | 12,8 |
| | 1,9 | 2,9 | 3,9 | 4,9 | 5,9 | 6,9 | 7,9 | 8,9 | 9,9 | 10,9 | 11,9 | 12,9 |
| | 1,10 | 2,10 | 3,10 | 4,10 | 5,10 | 6,10 | 7,10 | 8,10 | 9,10 | 10,10 | 11,10 | 12,10 |

301 (between columns 4 and 5); 302 (shaded region columns 9–12)

IMAGE CAPTURING APPARATUS

CROSS-REFERENCE TO RELATED APPLICATIONS

This application is a continuation application of U.S. Ser. No. 11/458,124, filed Jul. 18, 2006, which claims priority to Japan application serial No. 2005-209155, filed Jul. 19, 2005, all of which the contents of which are hereby incorporated by reference in their entirety.

BACKGROUND OF THE INVENTION

1. Field of the Invention

The present invention relates to a signal read technique in an image capturing apparatus.

2. Description of the Related Art

Figure 1:
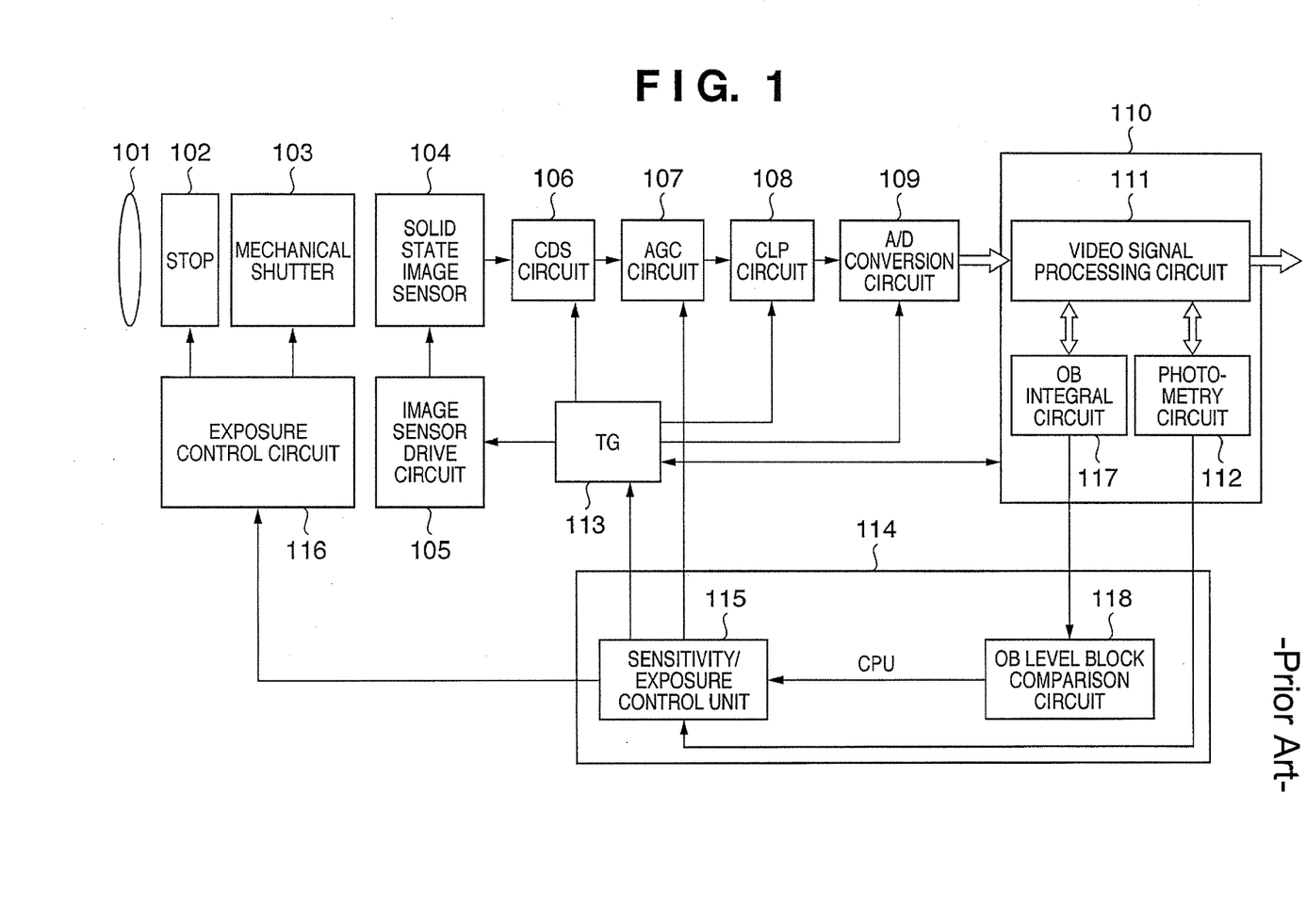
FIG. 1 is a block diagram showing the schematic arrangement of a conventional image capturing apparatus.

FIG. 1 is a circuit block diagram for explaining the configurations of an image sensing signal processing system and sensitivity/exposure control system of a conventional digital still camera using a solid state image sensor.

Reference numeral 101 denotes a lens for forming an object image on an image surface; 102, a stop for controlling the amount of light that has passed through the lens; 103, a mechanical shutter for allowing light which has passed through the lens to enter the image surface for a required period of time; and 104, a solid state image sensor which performs photo-electric conversion for the formed object image. Note that a main example of the solid state image sensor 104 is a CCD area sensor.

In recent years, an X-Y address type CMOS area sensor has been increasingly used as an image sensor. Hence, an image capturing apparatus using the CMOS area sensor will be described below.

Reference numeral 105 denotes an image sensor drive circuit which supplies a pulse having an amplitude for driving the CMOS area sensor; 106, a CDS circuit for performing correlated double sampling for the output from the CMOS area sensor; and 107, an AGC circuit for amplifying the output signal from the CDS circuit. The gain setting of the AGC circuit changes when a user changes the sensitivity setting of a camera depending on preference, or when the camera automatically increases the gain at a low luminance.

Reference numeral 108 denotes a clamp circuit for clamping an OB (optical black) potential (to be described later) to a reference potential of the output signal from the AGC circuit; and 109, an A/D conversion circuit for converting an analog image sensing signal output from the clamp circuit into a digital signal.

Reference numeral 110 denotes a video processing circuit having a video signal processing circuit 111 which processes the converted digital image sensing signal to luminance and color video signals (color difference signals such as R-Y and B-Y, or R, G, and B signals). The video processing circuit 110 also has a photometry circuit 112 which performs photometry on the basis of the level of a signal input from the CMOS area sensor. The video processing circuit 110 also has a WB (white balance) circuit or the like (not shown) which measures the color temperature of the object based on the signal input from the CMOS area sensor to extract information for performing white balance in the video signal processing circuit 111.

Reference numeral 113 denotes a timing pulse generation circuit which generates a timing pulse for each circuit in the camera; and 114, a CPU for controlling the camera. The CPU 114 has a function of instructing to change the gain of the above-described AGC circuit 107, and instructing an exposure control circuit 116 how to perform exposure, in order to control sensitivity and exposure based on the information from the above-described photometry circuit 112.

Figure 2:
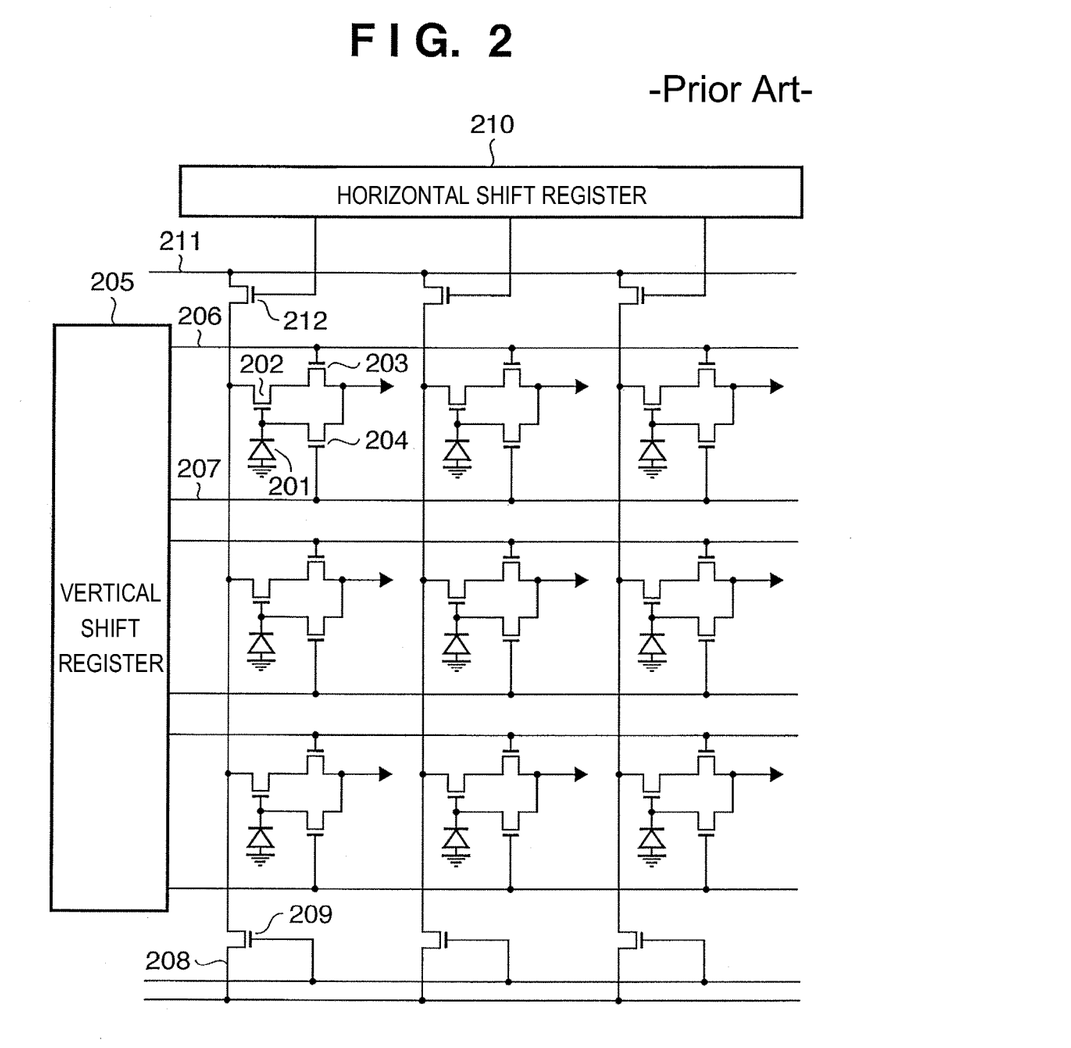
FIG. 2 is a circuit diagram of a conventional CMOS solid state image sensor.

FIG. 2 is a circuit diagram showing the conventional image capturing apparatus using the CMOS area sensor.

Unit cells are arrayed in a two-dimensional matrix, each of which has an amplification transistor 202 which amplifies a detection signal from a photodiode 201, a vertical selection transistor 203 which selects a line from which a signal is to be read, and a reset transistor 204 which resets signal charge. Note that the cells are arrayed in a 3×3 matrix in FIG. 2. However, more unit cells are actually arrayed.

A horizontal address line 206 is horizontally connected from a vertical shift register 205 to the gate of the vertical selection transistor 203 to select a line from which a signal is to be read. Likewise, a reset line 207 is horizontally connected from the vertical shift register 205 to the gate of the reset transistor 204. The source of the amplification transistor 202 is connected to a vertical signal line 208 connected in the column direction, and a load transistor 209 is connected to one end of the vertical signal line 208. The other end of the vertical signal line 208 is connected to a horizontal signal line 211 via a horizontal selection transistor 212 driven in accordance with a selection pulse supplied from a horizontal shift register 210.

Figure 3:
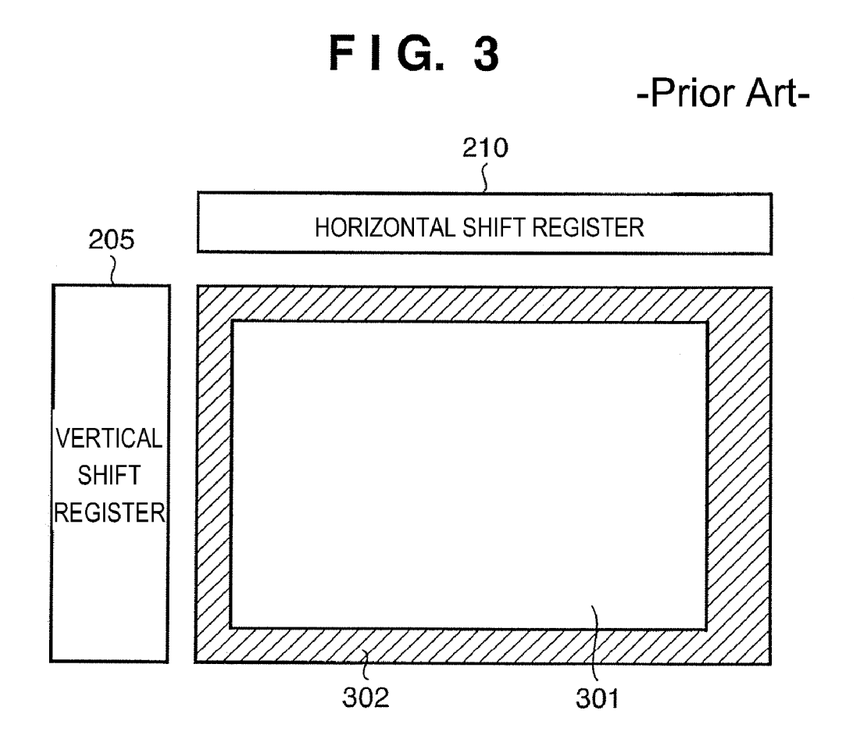
FIG. 3 is a view showing the schematic arrangement of a conventional solid state image sensor.

As shown in FIG. 3, the solid state image sensor has an effective image sensing pixel area 301 and an OB (optical black) pixel area 302 for adjusting an optical black reference. In the OB pixel area 302, photo-electric conversion elements (pixels) arranged in the outer frame portion of the solid state image sensor are shielded from light by aluminum or the like. The output from the light-shielded area is used as the optical black reference to perform video adjustment, i.e., so-called a clamping process.

Figures 4A, 4B:
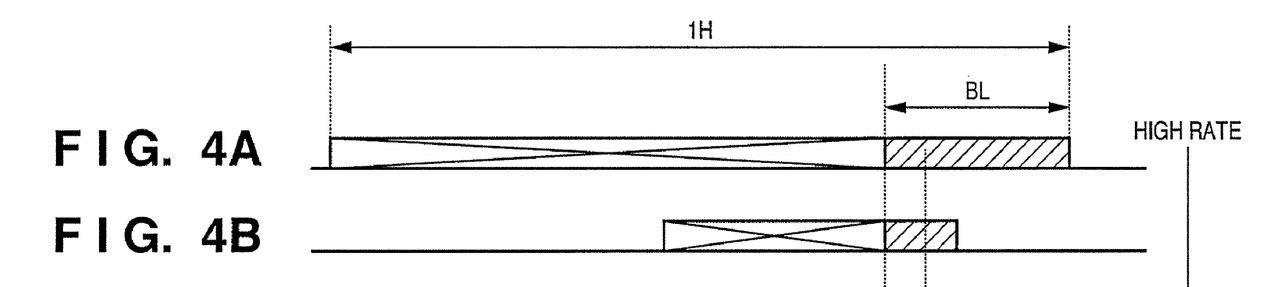
FIGS. 4A to 4C are timing charts for reading signals from the conventional solid state image sensor.

In moving image photographing in such conventional image capturing apparatus, electric charge accumulated in each photo-electric conversion element is read once per frame period, and one image is contained in one frame of the sensed video. In this case, as shown in FIG. 4A, the output signal in the OB pixel area is read once in a 1H (horizontal synchronization) period.

In a given image capturing apparatus, a stable OB clamping operation is executed by reading the same position in the OB pixel area regardless of the read modes of an arbitrary area and pixel signals, thereby preferably suppressing an FPN (fixed pattern noise) (see Japanese Patent Laid-Open No. 9-366193).

Furthermore, Japanese Patent Laid-Open No. 9-163236 discloses an image capturing apparatus which uses an X-Y address type solid state image sensor having the OB pixel area shielded from light in the outer frame portion of the effective image sensing area, and can be driven in a mode of reading pixels once every arbitrary number of pixels, or reading all pixels in the effective image sensing area. In this method, the OB pixel area may be read at a low rate by thinning out or decimating the pixels in the OB pixel area when the pixels in the effective image sensing area are read once every arbitrary number of pixels in a thinning-out mode, or may be read without thinning out the pixels in the OB pixel area even when the pixels in the effective image sensing area are read once every arbitrary number of pixels in the thinning-out mode.

In recent years, a frame rate is taken into consideration which especially influences the characteristics of a moving image photographing operation. Market needs for a high-resolution moving image whose size is VGA (640 (horizontal)×480 (vertical) pixels) or more in the image capturing apparatus such as a digital camera or digital camcorder.

A larger number of pixel signals must be read for each frame of the image sensor in order to photograph a high-resolution moving image. Accordingly, it is difficult to photograph a moving image at a high frame rate.

Figure 4C:
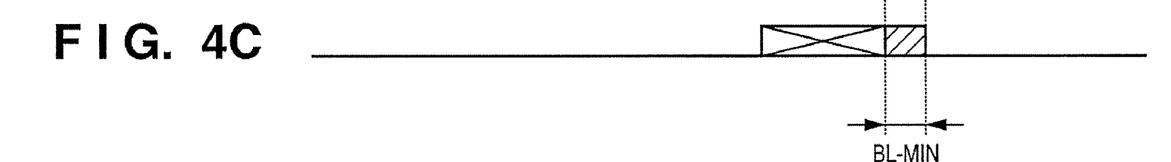

As general drive methods of reading the entire frame in the same mode, a thinning-out mode of thinning out pixels to ½ as shown in FIG. 4B, and a thinning-out mode of thinning out the pixels to ¼ as shown in FIG. 4C are available. The image capturing apparatus having these read modes must set the OB pixel area so as to ensure a sufficient OB clamp time at the highest thinning-out rate. Note that "OB clamping" represents an operation of subtracting signals in the OB pixel area from those in the effective image sensing area to remove, from the image signals, dark current components generated in the pixels. Since a given number of OB pixels must be read for effective OB clamping, a given period of time (OB clamp time) is required to read the required number of OB pixels.

However, in the image capturing apparatus having a plurality of read modes, when the OB pixel area is set to ensure the sufficient OB clamp time (the number of OB pixels to be read) at the highest thinning-out rate as described above, it is difficult to set a high frame rate in high-resolution video photographing. This is because when the OB pixel area is set as described above, the number of OB pixels to be read increases in reading at a low thinning-out rate, e.g., in reading all pixels. It takes an excessively long time to perform OB clamping, thereby prolonging the signal read time per frame. The same problem also occurs when performing pixel addition such as two-pixel addition or four-pixel addition in the horizontal direction.

SUMMARY OF THE INVENTION

The present invention has been made in consideration of the above problems, and has as its object to prevent a frame rate from decreasing in high-resolution video photographing even in an image capturing apparatus having a plurality of read modes.

In order to solve the above problem and achieve the above object, according to the first aspect of the present invention, an image capturing apparatus comprises an image capturing element which includes an effective image sensing area having a plurality of photo-electric conversion units, and a light-shielded area having a plurality of light-shielded photo-electric conversion units, and a drive unit which performs a first operation of reading, from the image capturing element, a signal having a first resolution based on a plurality of photo electric conversion units of the effective image sensing area, and a second operation of reading, from the image capturing element, a signal having a second resolution lower than the first resolution based on a plurality of photo electric conversion units of the light-shielded area.

According to the second aspect of the present invention, an image capturing apparatus comprises an image capturing element which includes an effective image sensing area having a plurality of photo-electric conversion units, and a light-shielded area having a plurality of light-shielded photo-electric conversion units, and a drive unit which performs a first operation of reading, from the image capturing element, a signal having a first resolution based on a plurality of photo electric conversion units of an area from one end to the other end of one line in the effective image sensing area, and a second operation of reading, from the image capturing element, signals of a plurality of continuous photo-electric conversion units in part of a line in the light-shielded area.

According to the third aspect of the present invention, an image capturing apparatus comprises an image capturing element which includes an effective image sensing area having a plurality of photo electric conversion units, and a light-shielded area having a plurality of light-shielded photo electric conversion units, and a drive unit which performs, in a first mode, a first operation of reading, from the image capturing element, a signal having a first resolution based on a plurality of photo electric conversion units of the effective image sensing area, and a second operation of reading, from the image capturing element, some signals based on a plurality of photo electric conversion units of the light-shielded area, and performs, in a second mode, a third operation of reading, from the image capturing element, a signal having a second resolution lower than the first resolution based on a plurality of photo electric conversion units of the effective image sensing area, and a fourth operation of reading, from the image capturing element, a signal having a third resolution lower than the first resolution based on a plurality of photo electric conversion units of the light-shielded area.

According to the fourth aspect of the present invention, an image capturing apparatus comprises an image capturing element which includes an effective image sensing area having a plurality of photo-electric conversion units, and a light-shielded area having a plurality of light-shielded photo-electric conversion units, and a drive unit which performs, in a first mode, a first operation of reading, from the image capturing element, a signal having a first resolution based on a plurality of photo electric conversion units of the effective image sensing area, and a second operation of reading, from the image capturing element, a signal having a second resolution based on a plurality of photo electric conversion units of the light-shielded area at a first read frequency, and performs, in a second mode, a third operation of reading, from the image capturing element, a signal having a third resolution lower than the first resolution based on a plurality of photo electric conversion units of the effective image sensing area, and a fourth operation of reading, from the image capturing element, a signal having a fourth resolution lower than the second resolution based on a plurality of photo electric conversion units of the light-shielded area at a second read frequency lower than the first read frequency.

Further features of the present invention will be become apparent from the following description of exemplary embodiments with reference to the attached drawings.

DESCRIPTION OF THE EMBODIMENTS

Preferred embodiments of the present invention will be described below.

First, the outline of the embodiments of the present invention will be described.

Figure 5A:
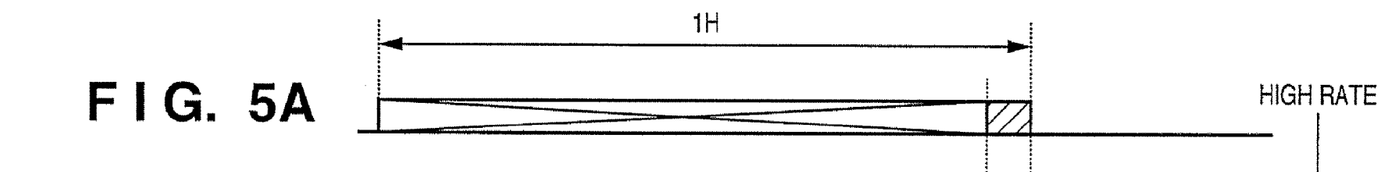
FIGS. 5A to 5C are timing charts for reading signals from a solid state image sensor according to an embodiment of the present invention.
Figure 5B:
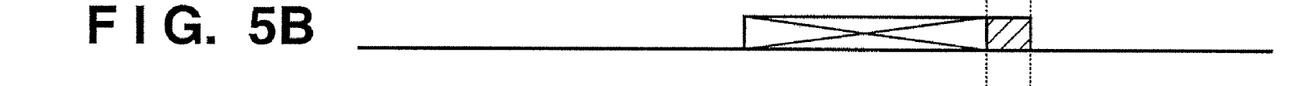
Figure 5C:
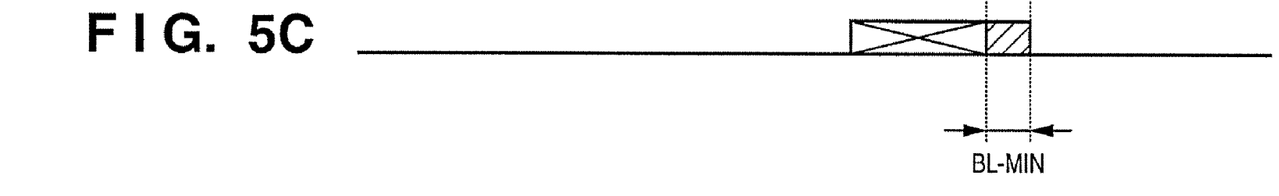

According to the embodiments of the present invention, an image capturing apparatus having a plurality of read modes can realize a high frame rate even in photographing a high-resolution moving image. That is, as shown in FIGS. 5A to 5C, all OB clamp times are made almost equal to the clamp time in the drive mode at the highest frame rate to shorten the read period of an OB (optical black) pixel area. In order to achieve this high frame rate, a signal read mode and read frequency are changed between an effective image sensing pixel area and OB pixel area, or a read operation in the OB pixel area is interrupted or starts from the middle of the OB pixel area.

Note that in the OB pixel area, photo-electric conversion elements (pixels) in the outer frame portion of a solid state image sensor are shielded from light by aluminum or the like. Hence, the OB pixel area is also called as a "light-shielded pixel area" hereinafter.

According to the embodiments of the present invention, the same method is applied to an image capturing apparatus which simultaneously adds, in a cell, signals from two vertically-adjacent photo-electric conversion units, and which can switch various addition read modes. For example, the various addition read modes include a method of adding the signals from the vertically aligned photo-electric conversion units and reading the addition result, and a method of adding signals from the horizontally aligned photo-electric conversion units and reading the addition result.

For example, Japanese Patent Laid-Open No. 9-46596 discloses a technique of simultaneously adding, in a cell, signals from two vertically aligned photo-electric conversion units. For example, Japanese Patent Laid-Open No. 2000-59696 discloses a technique of switching a mode in which signals from vertically aligned photo-electric conversion units are added to read the addition result, and a mode in which signals from horizontally aligned photo-electric conversion units are added to read the addition result.

A detailed embodiment of the present invention will be described below.

First Embodiment

Figure 6:
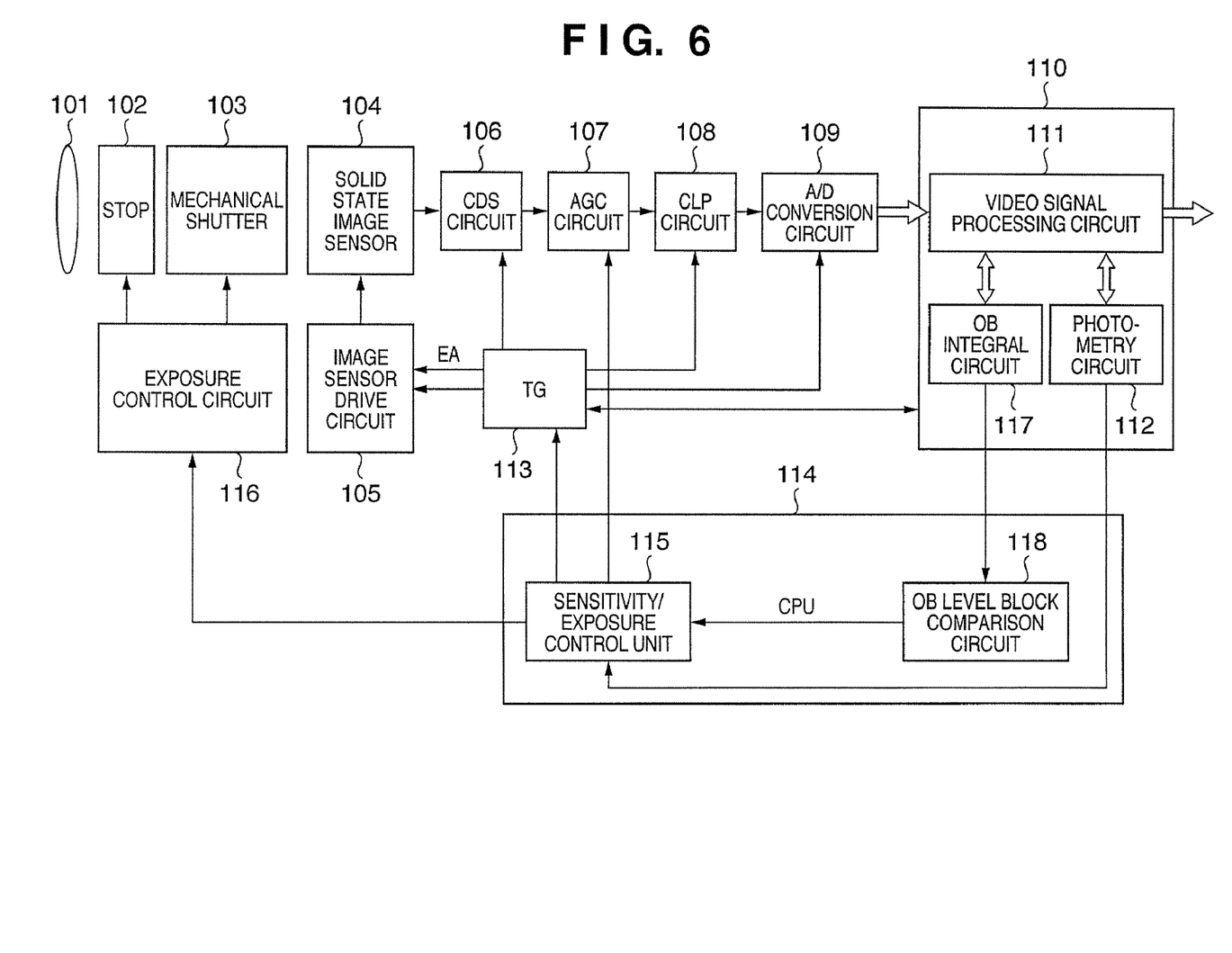
FIG. 6 is a block diagram showing an image capturing apparatus according to the first embodiment.

FIG. 6 is a block diagram showing the schematic arrangement of an image capturing apparatus according to the first embodiment of the present invention. An arrow EA represents a control signal for controlling a drive mode. Note that the outline of the remaining arrangement is the same as that in the prior art shown in FIG. 1. Hence, the same reference numerals in FIG. 6 denote the same components as those in FIG. 1, and a description thereof will be omitted. The operation in the first embodiment is mainly different from that in the prior art shown in FIG. 1.

Figure 7:
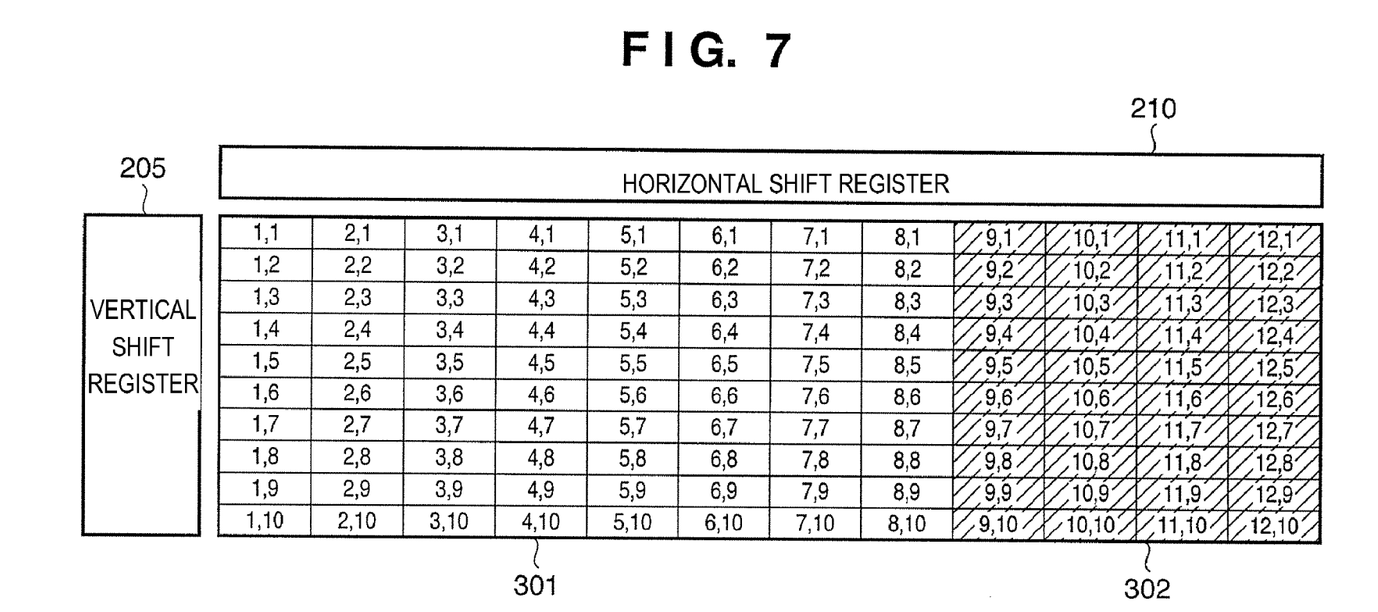
FIG. 7 is a schematic view of a solid state image sensor according to the first embodiment.

FIG. 7 is a schematic view of a solid state image sensor according to the first embodiment. The image sensor includes light-receiving pixels arrayed in a two-dimensional matrix, and the position of a light-receiving pixel is represented using an i (row)×j (column) matrix from the upper left. Note that in FIG. 7, the position of a pixel located on the ith row from the top and the jth column from the left is represented as (j, i). When all pixels are to be read, signals are read rightward from a pixel (1, 1). After one horizontal line is read, the next horizontal line is sequentially read.

In this case, the image capturing apparatus has a plurality of drive modes. The drive mode at the highest frame rate is a thinning-out read mode of thinning out the pixels to ½.

Figure 8A:
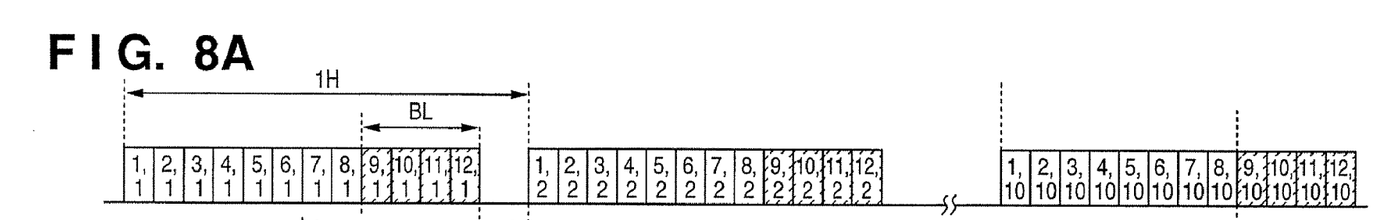
FIGS. 8A to 8E are timing charts for driving the image capturing apparatus according to the first embodiment.

FIG. 8A is a drive timing chart of the image capturing apparatus shown in FIG. 7, and shows a state wherein signal pixels are read from a CMOS area sensor when all areas are driven in an all-pixel read mode. In this case, reference symbol BL denotes an OB clamp time (a read time for OB pixels).

Figure 8B:
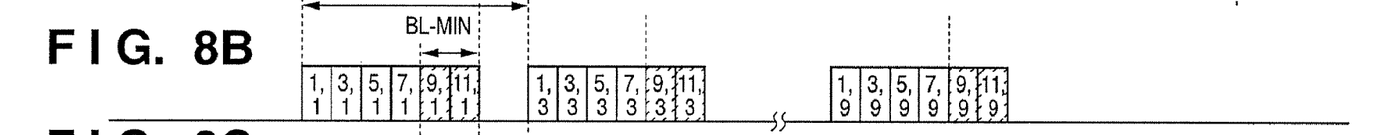

FIG. 8B is a timing chart showing a state wherein pixels in the image sensing pixel area and OB pixel area are thinned out and read at the highest thinning-out rate. In the above-described image capturing apparatus, the read time for two OB pixels is sufficient as a clamp time. In this case, the OB pixel area is set such that two pixels can be read at the highest thinning-out rate, and this minimum OB clamp time is defined as BL-MIN.

In this case, when all pixels are to be read from the entire frame as shown in FIG. 8A, four OB pixels are read, and the time for reading two OB pixels is wastefully consumed. To cope with this problem, according to the first embodiment, the drive scheme of the OB pixel area is changed such that only two OB pixels are read when driving all pixels in the entire frame in the all-pixel read mode. Accordingly, the read period for each horizontal line can be shortened by a difference between BL and BL-MIN.

Figure 8C:
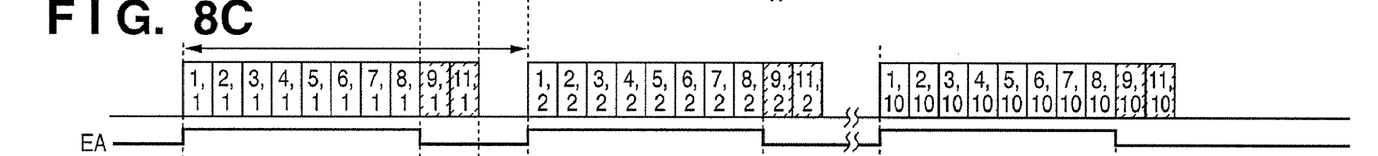

FIG. 8C is a timing chart when all pixels are read in the image sensing pixel area, and the OB pixel area is driven in a thinning-out mode at the highest frame rate, in which the pixels are thinned out to ½ in the horizontal direction. Accordingly, the read period for each horizontal line can be shortened by reducing the number of pixels to be read in the OB pixel area. As a result, in the image capturing apparatus having the plurality of drive modes, the OB read periods are shortened in all modes other than the drive mode at the highest frame rate, thereby realizing a high frame rate.

In the first embodiment, regardless of the drive mode of the effective image sensing pixel area, the OB pixel area is driven at the highest frame rate only when the control signal EA is on. Hence, in the image signal apparatus having the plurality of modes, the OB read periods are shortened in all modes other than the drive mode at the highest frame rate, thereby realizing a high frame rate.

Figures 8D, 8E:
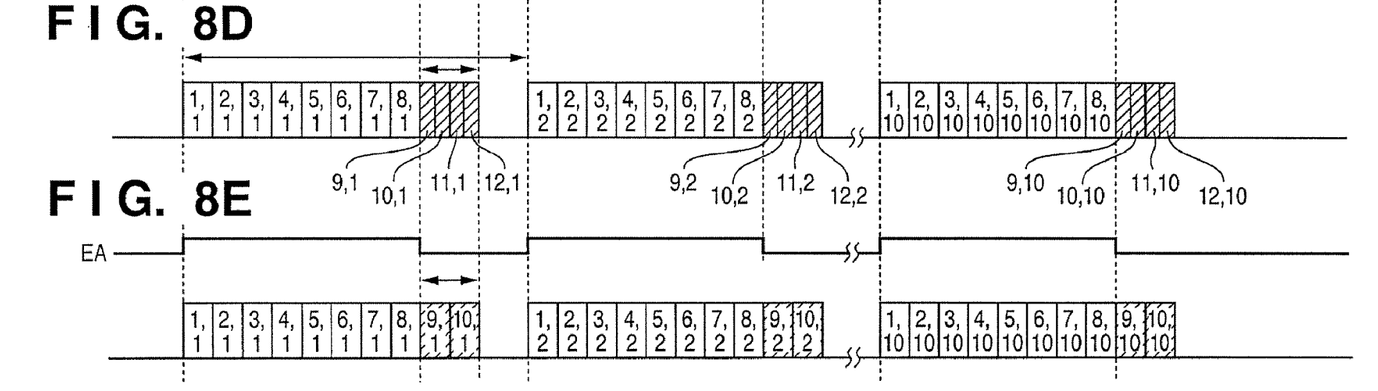

As shown in FIG. 8D, the read frequency of the OB pixel area may be increased only when the control signal EA is on, and the read period BL of the OB pixel area may be set almost equal to the read period BL-MIN of the OB pixel area at the highest frame rate. In this case, the OB read periods are also shortened in all modes other than the drive mode at the highest frame rate, thereby attaining a high frame rate.

In the above method, a new circuit for the control signal EA must be incorporated, and the circuit arrangement may become complicated. To cope with this problem, as shown in FIG. 8E, the read operation of the OB pixel area may be interrupted after elapse of the read period BL-MIN in the OB pixel area at the highest frame rate. In this case, the OB read periods are also shortened in all modes other than the drive mode at the highest frame rate, thereby realizing a high frame rate.

When signals in the OB pixel area are to be read before reading those in the effective image sensing pixel area in one horizontal line, the read operation may be started from the middle of the OB pixel area at a timing for ensuring a predetermined period of time (BL-MIN). Accordingly, the OB read periods are also shortened in all modes other than the drive mode at the highest frame rate, thereby realizing a high frame rate.

The contents of the operation sequence are stored as program codes in an arbitrary storage medium (not shown) in a digital camera, and read and executed by the CPU or the like in the digital camera.

Second Embodiment

Figure 9:
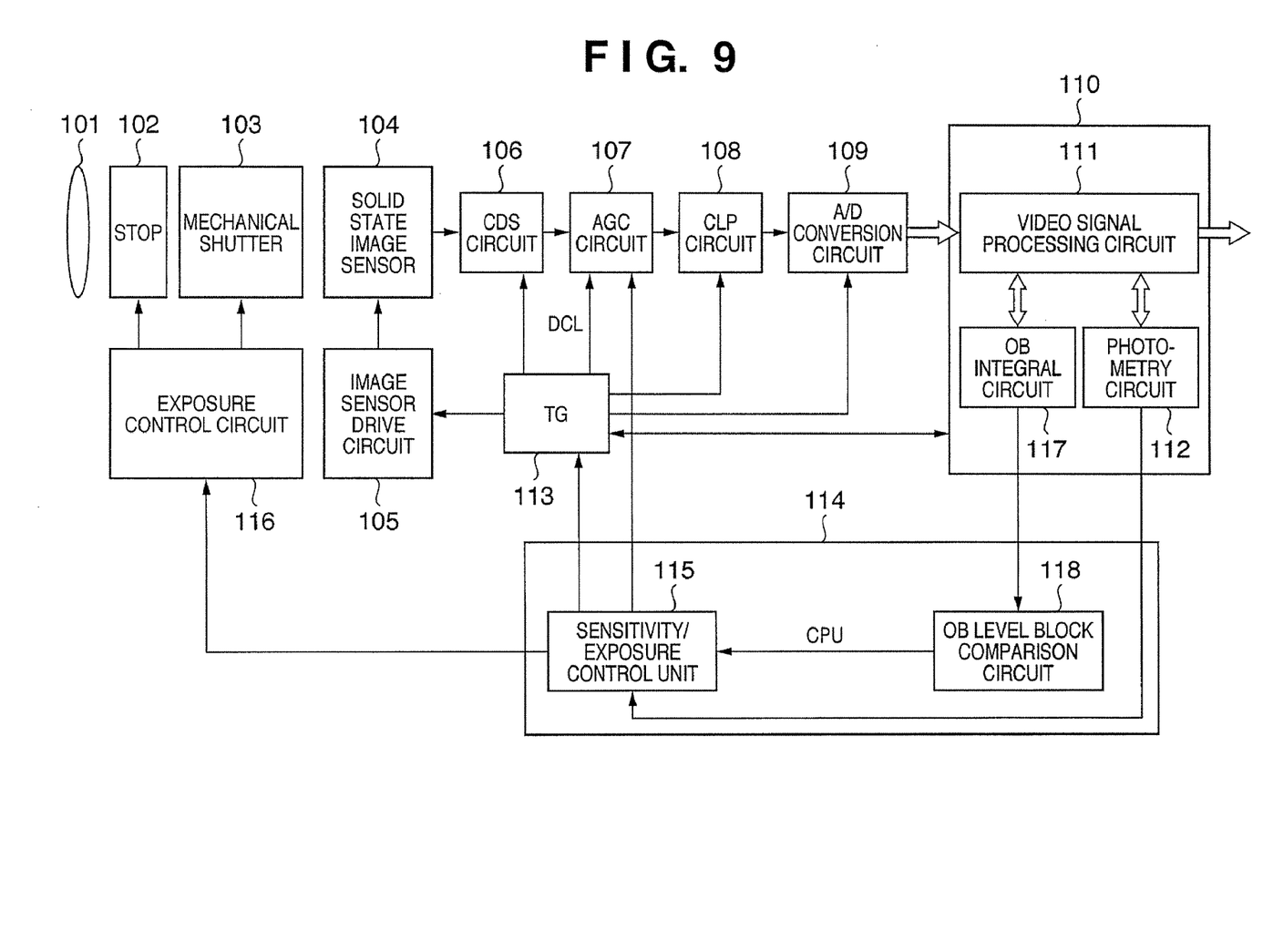
FIG. 9 is a block diagram showing an image capturing apparatus according to the second embodiment.
Figure 10:
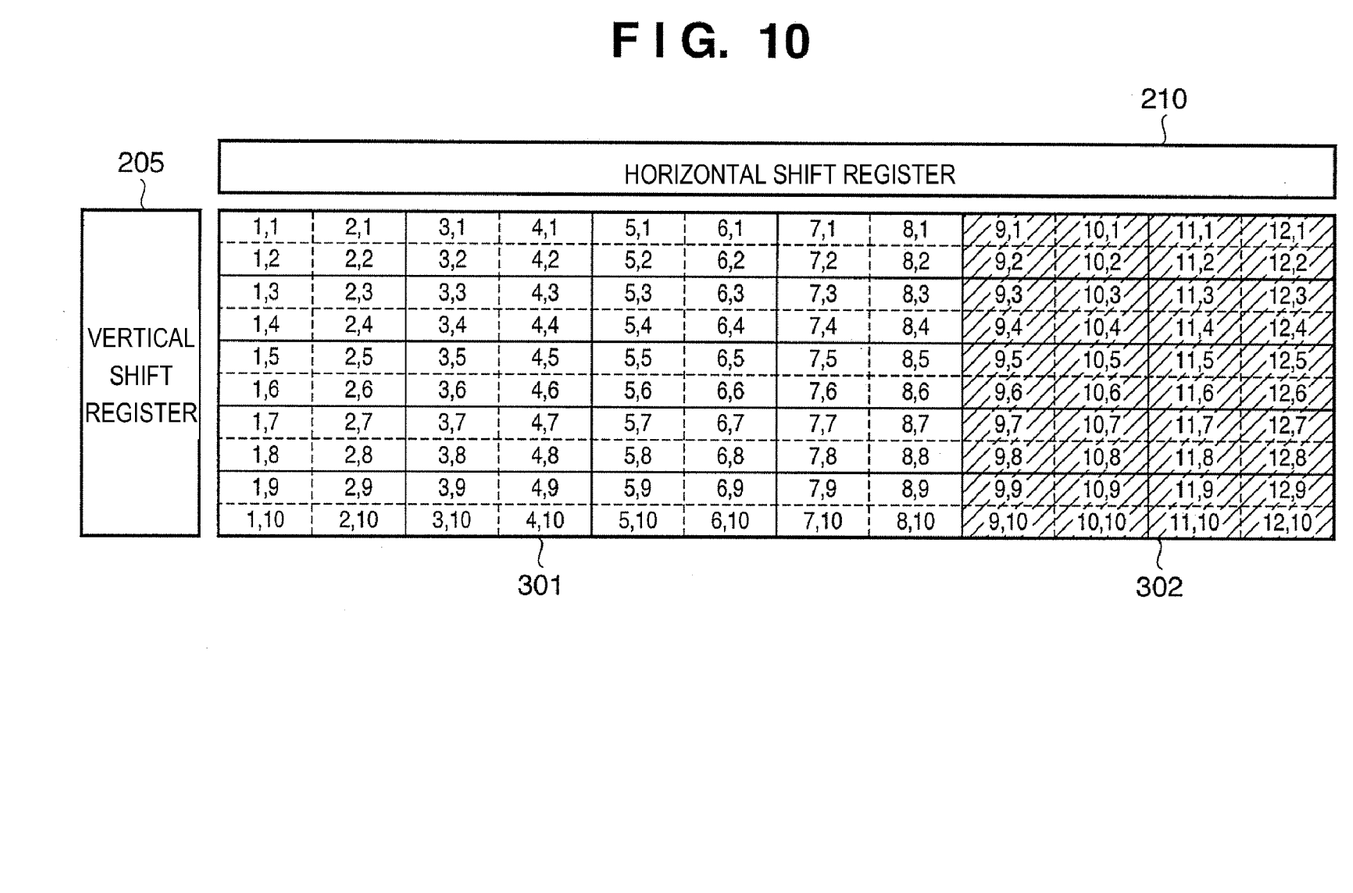
FIG. 10 is a schematic view of a solid state image sensor according to the second embodiment.

FIG. 9 is a block diagram showing the schematic arrangement of an image capturing apparatus according to the second embodiment of the present invention. An arrow DCL represents a control signal for controlling the gain of an AGC circuit 107 in pixel addition. Note that the outline of the remaining arrangement is the same as that in the prior art shown in FIG. 1. Hence, the same reference numerals in FIG. 9 denote the same components as those in FIG. 1, and a description thereof will be omitted. It is the operation in the second embodiment which is mainly different from that in the prior art shown in FIG. 1. FIG. 10 is a schematic view of a solid state image sensor according to the second embodiment.

In the second embodiment, the image sensor has four modes, i.e., an all-pixel read mode, vertical two-pixel addition mode, horizontal two-pixel addition mode, and four-pixel addition mode (horizontal×vertical). In this case, since a read method for each horizontal line is taken into consideration, the pixel addition modes other than the horizontal two-pixel addition mode will not be described below. Accordingly, the all-pixel read mode and horizontal two-pixel addition read mode will be described below.

Figure 11A:
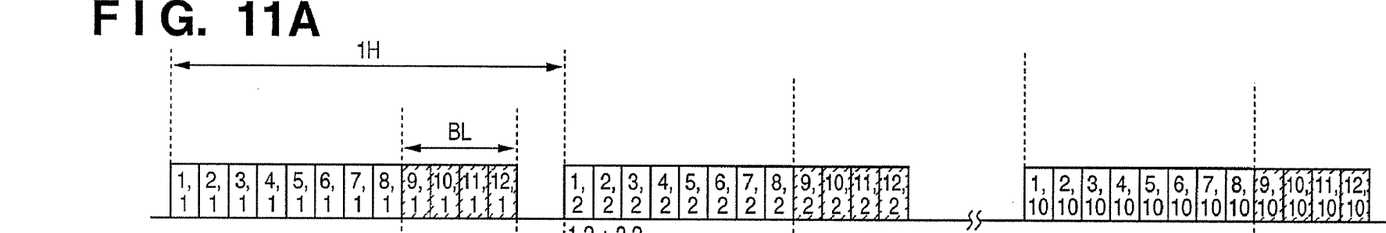
FIGS. 11A to 11C are timing charts for driving the image capturing apparatus according to the second embodiment.
Figure 11B:
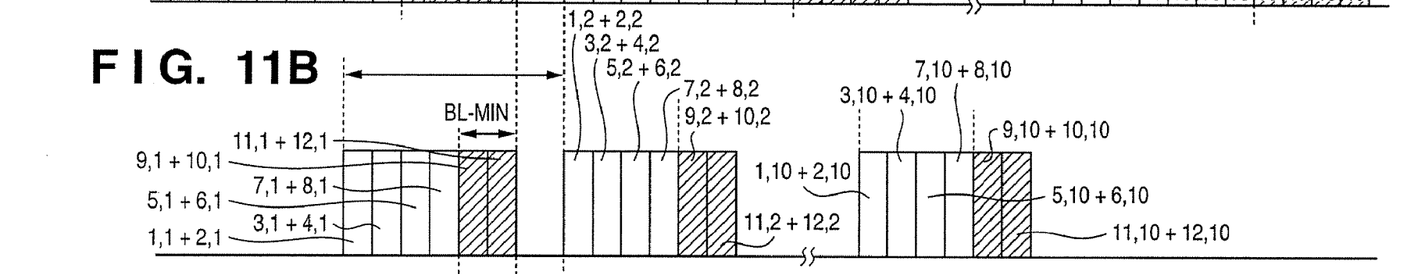

FIG. 11A is a timing chart similar to that in the first embodiment when all pixels are to be read in all areas. FIG. 11B is a timing chart in the horizontal two-pixel addition mode in which the electric charge amount to be read at once becomes twice that in the all-pixel read mode, because of pixel addition.

Figure 11C:
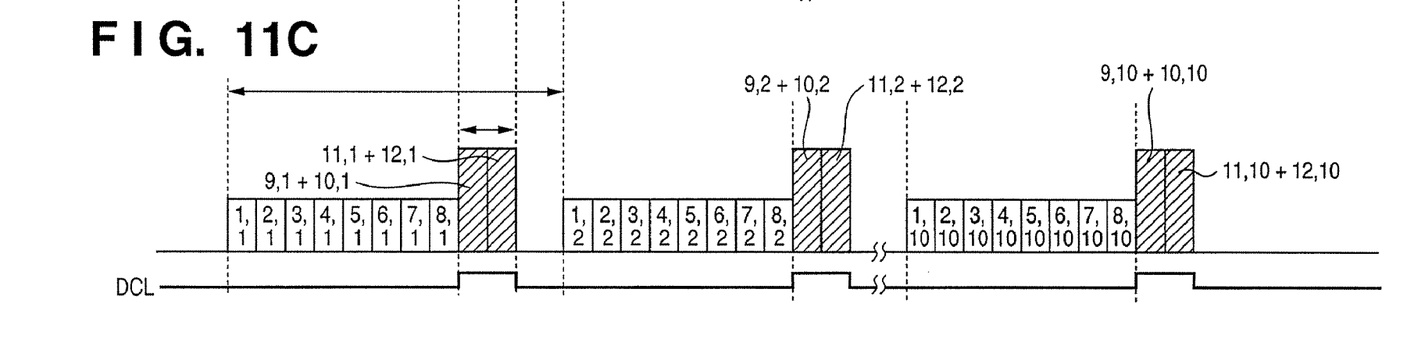

In consideration of this, in FIG. 11C, all pixels are read without performing horizontal two-pixel addition in an effective image sensing area, and horizontal two-pixel addition is performed only in an OB pixel area. In pixel addition, a signal amount per pixel period becomes twice that in the all-pixel read mode. Accordingly, a clamping process must be performed in the OB area in consideration of this. More specifically, in the AGC circuit, a rectangular pulse DCL is sent from a timing pulse generation circuit in reading a signal in the OB pixel area. After that, only when the DCL is on, the gain of the AGC is decreased by dividing the gain by the added pixel count (2 in two-pixel addition). Accordingly, the OB read periods are shortened in all modes other than the drive mode at the highest frame rate, thereby attaining a high frame rate. The contents of this operation are stored as program codes in an arbitrary storage medium (not shown) in a digital camera, and read and executed by a CPU or the like in the digital camera.

As described above, in the image capturing apparatus having a plurality of read modes, the signal read mode changes between the effective image sensing pixel area and the OB pixel area, and the OB read periods can be shortened in all modes other than the drive mode at the highest frame rate, thereby achieving a high frame rate. The same effect can be obtained when the read frequency changes between the effective pixel area and the OB pixel area, or when the read operation in the OB pixel area is interrupted, or started from the middle of the OB pixel area.

Other Embodiment

The object of the present invention is achieved even by supplying a storage medium (or recording medium) which stores software program codes for implementing the functions of the above-described embodiments to the system or apparatus, and causing the computer (or a CPU or MPU) of the system or apparatus to read out and execute the program codes stored in the storage medium. In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the above-described storage medium, the storage medium stores a program code corresponding to the above-described procedure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-209155, filed Jul. 19, 2005, which is hereby incorporated by reference herein in its entirety.

What is claimed is:

1. An image capturing apparatus comprising:
    an image sensor that has a plurality of photo-electric conversion units;
    a drive unit that drives said image sensor;
    a signal processing unit that adjusts a signal level of an image signal, which is obtained from the exposed photo-electric conversion units, on the basis of a black signal which is obtained from the unexposed photo-electric conversion units; and
    a control unit that controls said drive unit so that a reading-out resolution in a horizontal direction of the black signal from said image sensor is lower than a reading-out resolution in the horizontal direction of the image signal from said image sensor by thinning-out the black signal in the horizontal direction which is output from a predetermined number of photo-electric conversion units.

2. The apparatus according to claim 1, wherein said control unit has a first mode and a second mode, and said control unit controls said drive unit so that the reading-out resolution in the horizontal direction of the black signal is lower than the reading-out resolution in the horizontal direction of the image signal in the first mode, and said control unit controls said drive unit so that the reading-out resolution in the horizontal direction of the black signal is the same as the reading-out resolution in the horizontal direction of the image signal in the second mode.

3. A control method for an image capturing apparatus having an image sensor that has a plurality of photo-electric conversion units, and a signal processing unit that adjusts a signal level of an image signal, which is obtained from the exposed photo-electric conversion units, on the basis of a black signal which is obtained from the unexposed photo-electric conversion units, said method comprising the step of:

controlling so that a reading-out resolution in a horizontal direction of the black signal from the image sensor is lower than a reading-out resolution in the horizontal direction of the image signal from the image sensor.

4. The method according to claim 3, wherein said control step has a first mode and a second mode, and said control step controls so that the reading-out resolution in the horizontal direction of the black signal is lower than the reading-out resolution in the horizontal direction of the image signal in the first mode, and said control step controls so that the reading-out resolution in the horizontal direction of the black signal is the same as the reading-out resolution in the horizontal direction of the image signal in the second mode.

* * * * *